April 20, 1926.
W. F. CHESLEY
1,581,678
AUTOMATIC SHAFT DISCONNECTER
Filed April 20, 1925
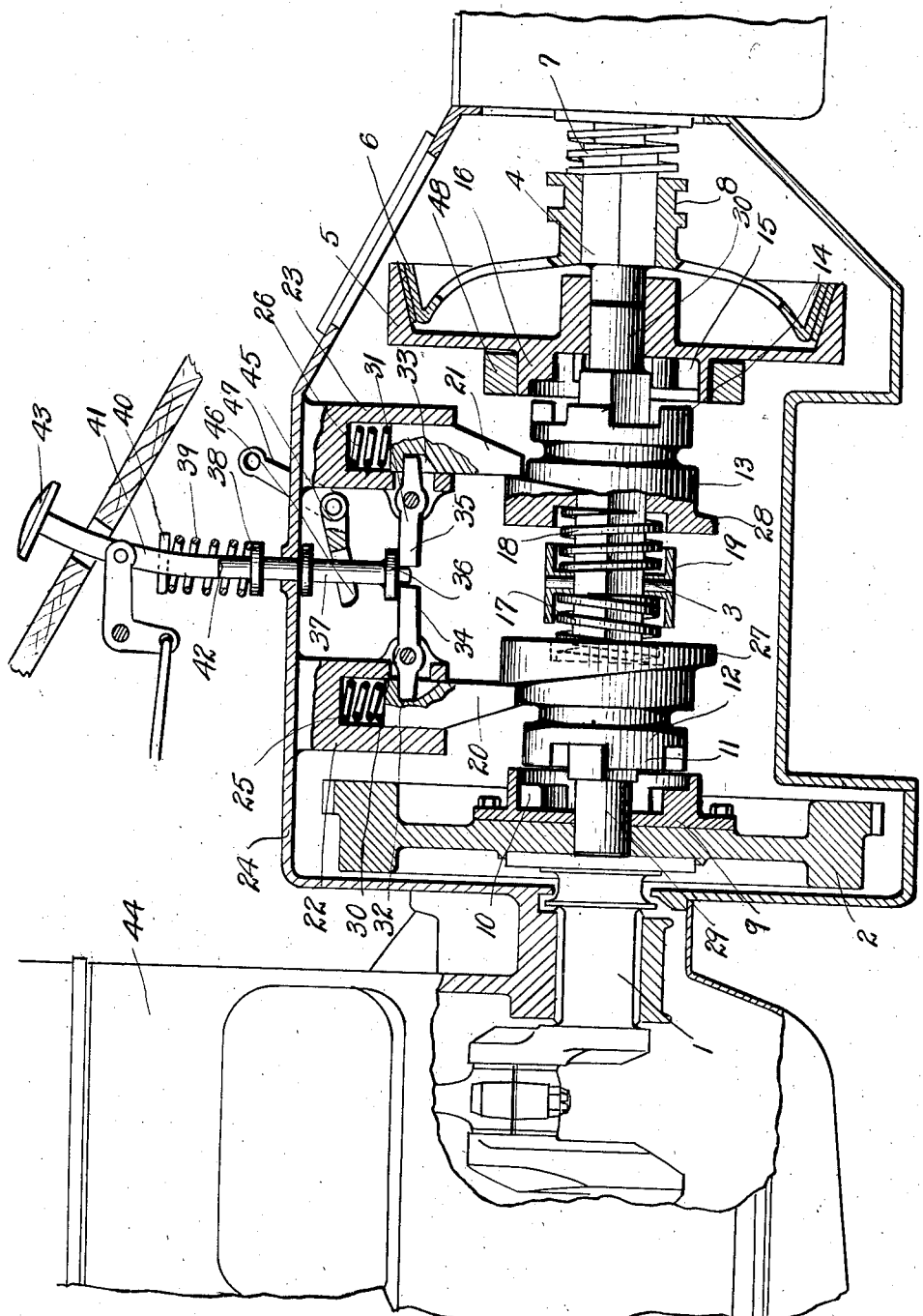
INVENTOR
Willis F. Chesley
BY
ATTORNEY Patented Apr. 20, 1926.

1,581,678

UNITED STATES PATENT OFFICE.

WILLIS F. CHESLEY, OF KANSAS CITY, MISSOURI.

AUTOMATIC SHAFT DISCONNECTER.

Application filed April 20, 1925. Serial No. 24,429.

*To all whom it may concern:*

Be it known that I, WILLIS F. CHESLEY, a citizen of the United States, residing at Kansas City, in the county of Jackson and State of Missouri, have invented certain new and useful Improvements in Automatic Shaft Disconnecters; and I do declare the following to be a full, clear, and exact description of the invention, such as will enable others skilled in the art to which it appertains to make and use the same, reference being had to the accompanying drawings, and to the figures of reference marked thereon, which form a part of this application.

This invention relates to an automatic shaft disconnecter and connecter. It is primarily intended for use in connection with motor vehicles, there being means provided whereby the operation or depressing of the accelerator pedal will cause certain mechanism to function in such manner that the driving shaft from the power plant will be connected to the driven shaft which transmits the power to the rear end, and release of the gas accelerator pedal will permit the same mechanism to function so that the driving shaft and driven shaft are disconnected.

Prior to my invention it has been the practice to throw out the clutch in descending steep grades so that the vehicle may coast without being connected up to the engine. Such method requires the application of the foot of the driver to the clutch pedal so that the clutch pedal must be depressed during the entire period of coasting. This is annoying, hard on the clutch and objectionable in other ways. With my invention, however, the two drive shafts will be mechanically disconnected in an automatic manner wherever the driver's foot moves over the accelerator or foot feed pedal, and the two shafts will be automatically connected whenever the foot feed pedal is depressed. My invention is not a substitute for the ordinary clutch, but is an auxiliary or supplemental attachment which in no way interferes with the proper functioning of the conventional clutch.

The novelty of the invention consists in certain parts and combinations of parts, all of which will be specifically referred to hereinafter, reference being had to the accompanying drawings, in which—

The figure is a view partly in section and partly in elevation of my invention applied.

Referring now to the drawings by numerals of reference, 1 designates one end of a crank shaft of conventional type of motor vehicle engine. 2 is a fly wheel. 3 is a drive shaft driven by the crank shaft and in turn driving the driven shaft 4 when certain clutch devices engage parts on the fly wheel and on the socket member or female part 5 of the clutch. The drive shaft 4 carries a sliding male member or cone 6 normally urged into the member 5 by an expansion spring 7 and adapted to be retracted by the ordinary clutch pedal having a fork engaged in the collar 8. The two members 5 and 6, the spring 7 and the clutch collar 8 illustrate a conventional form of cone clutch, but it is obvious that other forms of clutches such as disc clutches may be employed if desired. The fly wheel 2 carries a toothed clutch member 9 having teeth 10 between which the teeth 11 on the sliding clutch sleeve 12 may engage. The clutch sleeve is slidably but nonrotatably mounted upon the rectangular middle portion of the shaft 3 so that it will rotate the shaft when the teeth 10 and 11 are in interengagement. A similar clutch sleeve 13 is separated from the clutch sleeve 12, but slidably and nonrotatably mounted upon the shaft 3 and it has teeth 14 which may intermesh with the teeth 15 on the clutch member 16 carried by the main clutch member 5. The two sleeves 12 and 13 are normally urged into engagement with their complementary clutch members by the expansion springs 17 and 18, one end of each of which bears against a clutch sleeve, and the other end of each of which bears against an inner face of the collar 19 on shaft 3. The clutch sleeves are adapted to be held out of engagement with their complementary clutch members by cam actuators indicated as vertically sliding fingers 20 and 21 in the vertical guide blocks 22 and 23 carried by the case 24. These actuators are adapted to be urged inwardly toward the axis of the shaft 3 by the expansion springs 25 and 26 in the guides 22 and 23 so that they will tend to move adjacent to the edges of the cams 27 and 28 on the sleeves 12 and 13. When they are not in position to contact with the high lobes of the cams 27 and 28 the sleeves will be urged toward the transverse middle portion of the shaft 3 so that the clutch teeth 11 and 14 of the sleeves 12 and 13 will be withdrawn from engagement with their complementary teeth, and since the ends 29 and 30 of the shaft 3 are loosely mounted in the fly wheel and the clutch member 5 respectively, it will be apparent that the fly wheel and crank shaft 1 may turn without imparting any motion to the drive shaft 3, and since the driven shaft 4 can rotate only through the medium of the shaft 3, it will be apparent that when the drive shaft 3 is disconnected from both the crank shaft and the driven shaft no motion may be imparted to the driven shaft from the power plant, nor can the power plant receive motion from the driven shaft when the motor vehicle is coasting.

The cam intercepting members 20 and 21 can be withdrawn from engagment with the cams by two pivoted levers 30 and 31, these being mounted on the guides 22 and 23. The toe portions of the levers engage recesses 32 and 33 in the members 20 and 21. The heel portions 34 and 35 are adapted to be engaged by the collar 36 on the stem 37 projecting through the case 24. The stem 37 is provided with a collar 38 against which one end of a coil spring 39 bears. The other end bears against the seat 40 on the foot feed pedal stem 41, the lower end of which abuts against the upper end of the stem 37 at 42. When the operator presses upon the pedal 43 of the foot feed, the stem 37 will be depressed, rocking the levers 30 and 31 to retract the members 20 and 21 from engagement with the high lobes of the cams 27 and 28. Then the springs 17 and 18 will force the clutch sleeves 12 and 13 in opposite directions so that the teeth 11 will engage the teeth 10 of the clutch member 9, and the teeth 14 will engage the complementary clutch teeth 15 of the clutch member 16. Therefore, if the cone 6 is in engagement with the member 5, power will be communicated from the engine or power plant 44 to the drive shaft to propel the vehicle, but when the operator's foot is released from pedal 43 the springs 25 and 26 being strong enough, will force the fingers 20 and 21 into position so that then the high lobes of the cams ride on them, the two clutch sleeves 12 and 13 will be withdrawn from engagement with the fly wheel supported clutch member and the member 5.

If desired a forked lever 45 may be pivoted in the case so that when the toe portion 46 is depressed the stem 37 will move the heel members 34 and 35 of the levers 30 and 31 downward to withdraw the fingers 20 and 21. The fork can be actuated by suitable linkage connected to a lever arm 47 on fork 46.

From the foregoing it will be apparent that whenever the foot feed pedal is depressed, the drive shaft 3 will be clutched to the engine and the driven shaft, and that whenever the foot feed pedal is released the power plant will be disconnected from the drive shaft and the drive shaft will be disconnected from the driven shaft causing automatic connecting and disconnecting to take place independent of the normal clutch mechanism unless the toe 46 of the lever connected to arm 47 is put into play. As a result the automatic clutch connecting and disconnecting mechanism may be rendered ineffective on occasion to cause release of the drive shaft from the crank shaft and from the driven shaft. The clutch member 5 may be appropriately placed in a suitable bearing generically indicated at 48.

What I claim and desire to secure by Letters-Patent is:

1. In combination with the driving and driven shafts of an internal combustion engine, a yieldingly urged clutch interposed between the shafts, means for restraining the clutch, means including a reciprocatory rod for controlling supply of fuel to the engine, and means mechanically operable by said rod to release the clutch restraining means.

2. In combination with the driving and driven shafts of an internal combustion engine, a spring urged clutch for connecting said shafts, means for restraining the clutch, means including a foot pedal for controlling supply of fuel to engine, lever mechanism operable by the foot pedal, and means operable by the lever mechanism for shifting the restraining means to permit the clutch to shift.

3. In combination with the driving and driven shafts of an internal combustion engine, a clutch for connecting said shafts comprising a member yieldingly urged to closed position, means controlling flow of fuel to the engine comprising a normally yielding, retracted foot pedal, and means having cam relation to the clutch member to normally restrain the clutch member, and operable by the foot pedal to permit the clutch to seat.

4. In combination with the crank shaft of an internal combustion engine, a power transmission shaft, clutch members on said shafts, connected clutch members for coupling the first named clutch members, means yieldingly urging the coupling clutch members to effect the coupling, cams for restraining the coupling clutch members, a fuel controlling throttle member for the engine, and means responsive to movements of the throttle member for shifting the cams.

5. The combination with a crank shaft of an internal combustion motor for motor vehicles, a transmission shaft in line therewith and spaced therefrom, and a foot throttle pedal having a stem for controlling the flow of fuel to the engine, of means controlled by the foot throttle pedal for connecting and disconnecting the two shafts, said means comprising a shaft in line with and between the ends of the first named shafts, spring urged clutch collars slidable on the third shaft but held against rotative movement with respect to the third shaft, clutch members carried by the first two shafts mounted for co-operative engagement with the clutch collars, a spring urging the clutching collars to functional position, cams on the clutch collars, spring actuated projectible fingers normally urged into engagement with the cams, and finger-retracting levers in the path of movement of the stem of the foot throttle pedal, and operable thereby to release the clutch collars.

6. The combination with the crank shaft of an internal combustion motor for motor vehicles, a transmission shaft in line therewith and spaced therefrom, and a foot throttle pedal having a stem for controlling the flow of fuel to the engine, of means controlled by the foot throttle pedal for connecting and disconnecting the two shafts, said means comprising a shaft in line with and between the ends of the first named shafts, clutch collars slidable on the third shaft but held against rotative movement with respect to the third shaft, clutch members carried by the first two shafts mounted for co-operative engagement with the clutch collars, a spring interposed between the clutch collars urging the collars to engagement with the clutch members on the driving and driven shafts, cams on the clutch collars, spring actuated projectible fingers normally urged into engagement with the cams to restrain and return said collars, finger-retracting levers in the path of movement of the stem of the foot throttle pedal, and a spring for normally urging the stem away from the levers.

7. In the internal combustion engine of a motor vehicle comprising a foot throttle pedal having a stem for controlling the supply of fuel to the engine, a crank shaft, a transmission shaft in line with, but spaced from the crank shaft, clutch mechanism spring urged to connect the shafts, and means controlled by the foot throttle pedal operable to release the clutch mechanism upon movement of the pedal in one direction and to return the clutch mechanism upon movement of the pedal in the opposite direction.

8. In combination with the driving and driven shafts of an internal combustion engine, a clutch member, means yieldingly urging the clutch member to connect the shafts, means, including a reciprocatory rod, for controlling supply of fuel to the engine, and latch mechanism normally restraining the clutch member and operable by said rod to release the clutch member.

In testimony whereof I affix my signature.

WILLIS F. CHESLEY.